(12) United States Patent
Arai et al.

(10) Patent No.: US 12,257,480 B2
(45) Date of Patent: Mar. 25, 2025

(54) ESTIMATED GOAL TIME DISPLAY DEVICE, ESTIMATED GOAL TIME DISPLAY CONTROL METHOD, AND STORAGE MEDIUM

(71) Applicant: CASIO COMPUTER CO., LTD., Tokyo (JP)

(72) Inventors: Masamichi Arai, Chofu (JP); Nobuyoshi Nishizaka, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 295 days.

(21) Appl. No.: 17/798,045

(22) PCT Filed: Feb. 1, 2021

(86) PCT No.: PCT/JP2021/003512
§ 371 (c)(1),
(2) Date: Aug. 5, 2022

(87) PCT Pub. No.: WO2021/157519
PCT Pub. Date: Aug. 12, 2021

(65) Prior Publication Data
US 2023/0075777 A1    Mar. 9, 2023

(30) Foreign Application Priority Data

Feb. 7, 2020    (JP) .................................. 2020-019452

(51) Int. Cl.
*A63B 24/00*    (2006.01)
*A63B 71/06*    (2006.01)
(Continued)

(52) U.S. Cl.
CPC ...... *A63B 24/0062* (2013.01); *A63B 71/0686* (2013.01); *A63B 2024/0068* (2013.01);
(Continued)

(58) Field of Classification Search
CPC ............ A63B 24/0062; A63B 71/0686; A63B 2024/0068; A63B 2220/20;
(Continued)

(56) References Cited

U.S. PATENT DOCUMENTS 6,246,362 B1    6/2001    Tsubata et al.
8,562,489 B2    10/2013    Burton et al.
(Continued)

FOREIGN PATENT DOCUMENTS

JP    H1039059 A    2/1998
JP    H10234685 A    9/1998
(Continued)

OTHER PUBLICATIONS

Extended European Search Report (EESR) dated Feb. 12, 2024, issued in counterpart European Application No. 21751409.0.
(Continued)

*Primary Examiner* — Brandi N Hopkins
(74) *Attorney, Agent, or Firm* — Holtz, Holtz & Volek PC

(57) ABSTRACT

An estimated goal time display system includes at least one processor; and at least one memory. The at least one processor is configured to perform the following according to a program stored in the at least one memory: first deriving that derives a pace that a user runs a distance set in advance based on exercise data obtained when the user is running; second deriving that derives an estimated goal time that the user will reach a preset goal point, a faster-pace estimated goal time that the user will reach the goal point if the user makes the pace a predetermined amount of time faster, and a slower-pace estimated goal time that the user will reach the goal point if the user makes the pace a predetermined amount of time slower; and display controlling that displays on a display the estimated goal time, the faster-pace estimated goal time and the slower-pace estimated goal time.

25 Claims, 11 Drawing Sheets

(51) Int. Cl.
  *G04G 9/00* (2006.01)
  *G06F 1/16* (2006.01)
(52) U.S. Cl.
  CPC ....... *A63B 2220/20* (2013.01); *A63B 2220/62* (2013.01); *G06F 1/163* (2013.01)
(58) Field of Classification Search
  CPC ..... A63B 2220/62; A63B 71/06; G06F 1/163; G06F 3/0482; G06F 3/0484; A61B 5/1118; A61B 5/681; A61B 5/11; A61B 5/02438; G04G 21/02; H04W 4/02; G16H 20/30
  See application file for complete search history.

(56) References Cited

U.S. PATENT DOCUMENTS

| | | | |
|---|---|---|---|
| 9,656,119 | B2 | 5/2017 | Ura et al. |
| 10,085,692 | B2 | 10/2018 | Ura |
| 2015/0061889 | A1 | 3/2015 | Kotaki et al. |
| 2015/0099477 | A1 | 4/2015 | Sato |
| 2015/0120186 | A1 | 4/2015 | Heikes et al. |
| 2019/0266505 | A1 | 8/2019 | Gindre et al. |

FOREIGN PATENT DOCUMENTS

| | | | |
|---|---|---|---|
| JP | H10332414 A | | 12/1998 |
| JP | 2009118403 A | | 5/2009 |
| JP | 2012524638 A | | 10/2012 |
| JP | 2014054351 A | * | 3/2014 |
| JP | 2014106047 A | | 6/2014 |
| JP | 2014117512 A | | 6/2014 |
| JP | 2014124448 A | | 7/2014 |
| JP | 2014198206 A | | 10/2014 |
| JP | 2015047208 A | | 3/2015 |
| JP | 2015073591 A | | 4/2015 |
| JP | 2018143536 A | | 9/2018 |
| WO | 2013132582 A1 | | 9/2013 |

OTHER PUBLICATIONS

International Search Report (ISR) (and English language translation thereof) dated Apr. 13, 2021, issued in International Application No. PCT/JP2021/003512.

Written Opinion dated Apr. 13, 2021, issued in International Application No. PCT/JP2021/003512.

International Preliminary Report on Patentability (IPRP) (and English language translation thereof) dated Jul. 28, 2022 Issued in counterpart International Application No. PCT/JP2021/003512.

* cited by examiner

ESTIMATED GOAL TIME DISPLAY DEVICE, ESTIMATED GOAL TIME DISPLAY CONTROL METHOD, AND STORAGE MEDIUM

BACKGROUND

Technical Field

The present disclosure relates to an estimated goal time display apparatus, an estimated goal time display control method, a program, and an estimated goal time display system.

Description of Related Art

Conventionally, for example, JP H10-332414 proposes a portable apparatus to accurately measure the distance travelled by the runner during running and to display an estimated time that a runner reaches a set travelling distance when the runner continues to travel at a travelling speed measured at a point when the runner reaches a point at a predetermined distance.

SUMMARY

An estimated goal time display system includes:
at least one processor; and
at least one memory,
wherein the at least one processor is configured to perform the following according to a program stored in the at least one memory,
first deriving that derives a pace that a user runs a distance set in advance between a start point and a goal point, based on exercise data obtained when the user is running;
second deriving that derives an estimated goal time that the user will reach a preset goal point based on the pace derived in the first deriving, a faster-pace estimated goal time that the user will reach the goal point if the user makes the pace a predetermined amount of time faster, and a slower-pace estimated goal time that the user will reach the goal point if the user makes the pace a predetermined amount of time slower; and
display controlling that displays on a display the estimated goal time, the faster-pace estimated goal time and the slower-pace estimated goal time derived in the second deriving.

DESCRIPTION OF EMBODIMENTS

Embodiments of the present disclosure are described in detail with reference to the attached drawings.

<Configuration of Running Watch>

In the following, running includes any motion in which a human uses his legs and moves, examples including walking, jogging, competitive walking, and the like.

Figure 1:
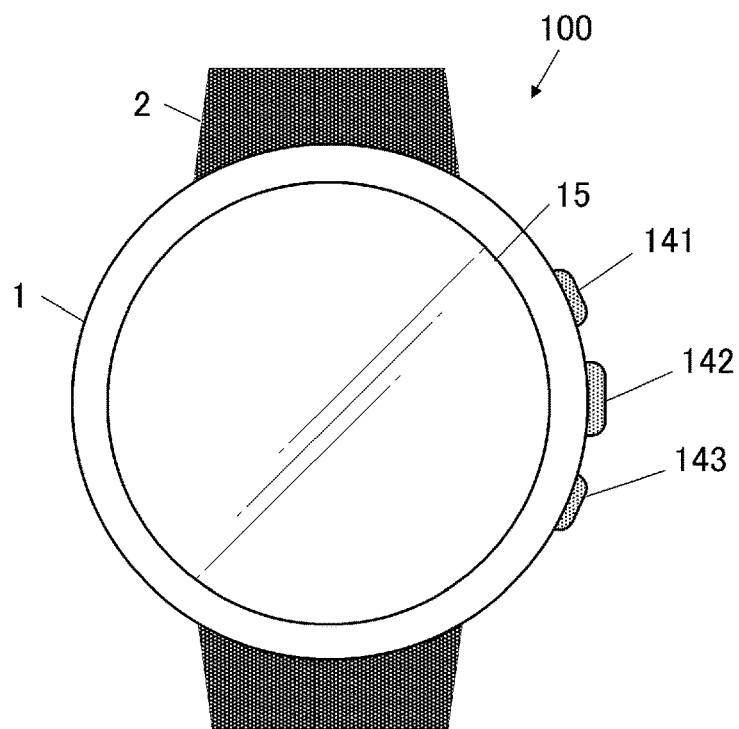
FIG. 1 is a diagram showing an outer appearance of a running watch.

The functions of the present disclosure described below can be realized as a function in a wrist watch or can be realized as an application in a smartwatch. Below, the above are collectively referred to as a running watch. FIG. 1 is a diagram showing an outer appearance of a running watch 100 according to an embodiment applying a running index display apparatus of the present disclosure.

As shown in FIG. 1, the running watch 100 is a wristwatch and includes a main body 1 and a band 2.

The main body 1 is a circular shape in a plan view and includes a display 15 (described below) on its upper surface. The main body 1 includes first to third operation buttons 141 to 143 on its right side lateral surface.

The band 2 is for fixing the main body 1 to a wrist of a user.

Next, the functional configuration of the running watch 100 is described with reference to FIG. 2.

Figure 2:
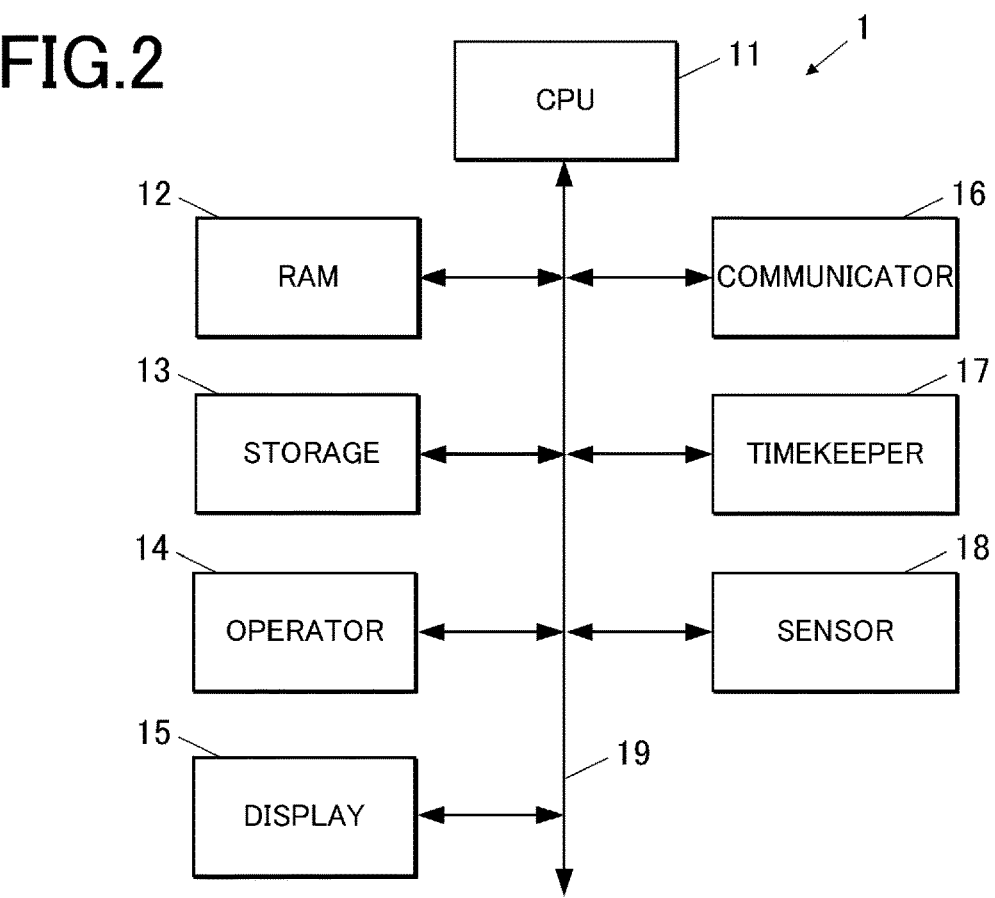
FIG. 2 is a block diagram showing a functional configuration of a running watch.

FIG. 2 is a block diagram showing a functional configuration of the running watch 100.

As shown in FIG. 2, the main body 1 of the running watch 100 includes a CPU (Central Processing Unit) 11, a RAM (Random Access Memory) 12, a storage 13, an operator 14, a display 15, a communicator 16, a timekeeper 17, a sensor 18, and the like. Each unit is connected through a bus 19.

The CPU (first deriver, second deriver, display controller, first acceptor, second acceptor, determiner) 11 is a processor that controls each unit of the main body 1. The CPU 11 reads out the program stored in the storage 13 and deploys the program in the RAM 12. Then, the CPU 11 executes the program and performs various arithmetic processing.

The RAM 12 provides a memory space for work to the CPU 11 and stores temporary data. The RAM 12 may include a nonvolatile memory.

The storage 13 stores various data such as a program executed by the CPU 11 and setting data. The program is stored in the storage 13 in a form of a computer readable program code. As the storage 13, a storage apparatus that does not need a power supply in order to maintain the data is used. Examples include a flash memory, etc.

The operator 14 includes a first operation button 141 provided on the right side lateral surface of the main body 1, a second operation button 142, and a third operation button 143 which are provided on the right lateral surface of the main body 1, and a touch sensor (not shown) provided on the display 15. The operator 14 accepts input operation by the user, converts the contents of the operation to electrical signals and outputs the signals to the CPU 11.

The display 15 includes a LCD (Liquid Crystal Display) and displays screens according to display control signals from the CPU 11. The above touch sensor is provided on the display screen of the display 15, and functions as a touch panel type operator/display.

The communicator 16 is a communication module including an antenna, a modulating/demodulating circuit, a signal processing circuit, and the like. For example, the communicator 16 performs wireless data communication with external terminal apparatuses according to a communication standard related to short range wireless communication by BLE (Bluetooth (registered trademark) Low Energy).

For example, the timekeeper 17 includes a timer, a timekeeping circuit, and the like. The timekeeper 17 measures the present time and obtains time information.

The sensor 18 includes a motion sensor such as a 3-axis acceleration sensor, a gyro sensor, a magnetometer sensor, etc. so as to be able to detect motion information of the user, and a GPS receiver so as to be able to obtain position information of the user. The measured results are output to the CPU 11. The motion information measured by the sensor 18 and the position information are referred to as exercise data, and based on such exercise data, the CPU 11 derives various display data including a running index described below.

Methods to derive the running index based on the exercise data are disclosed in, for example, JP 2014-124448, and here, the description of the method to derive the running index is omitted.

<Overview of Operation of Running Watch>

Next, the operation of the running watch 100 is described with reference to FIG. 3.

Figure 3:
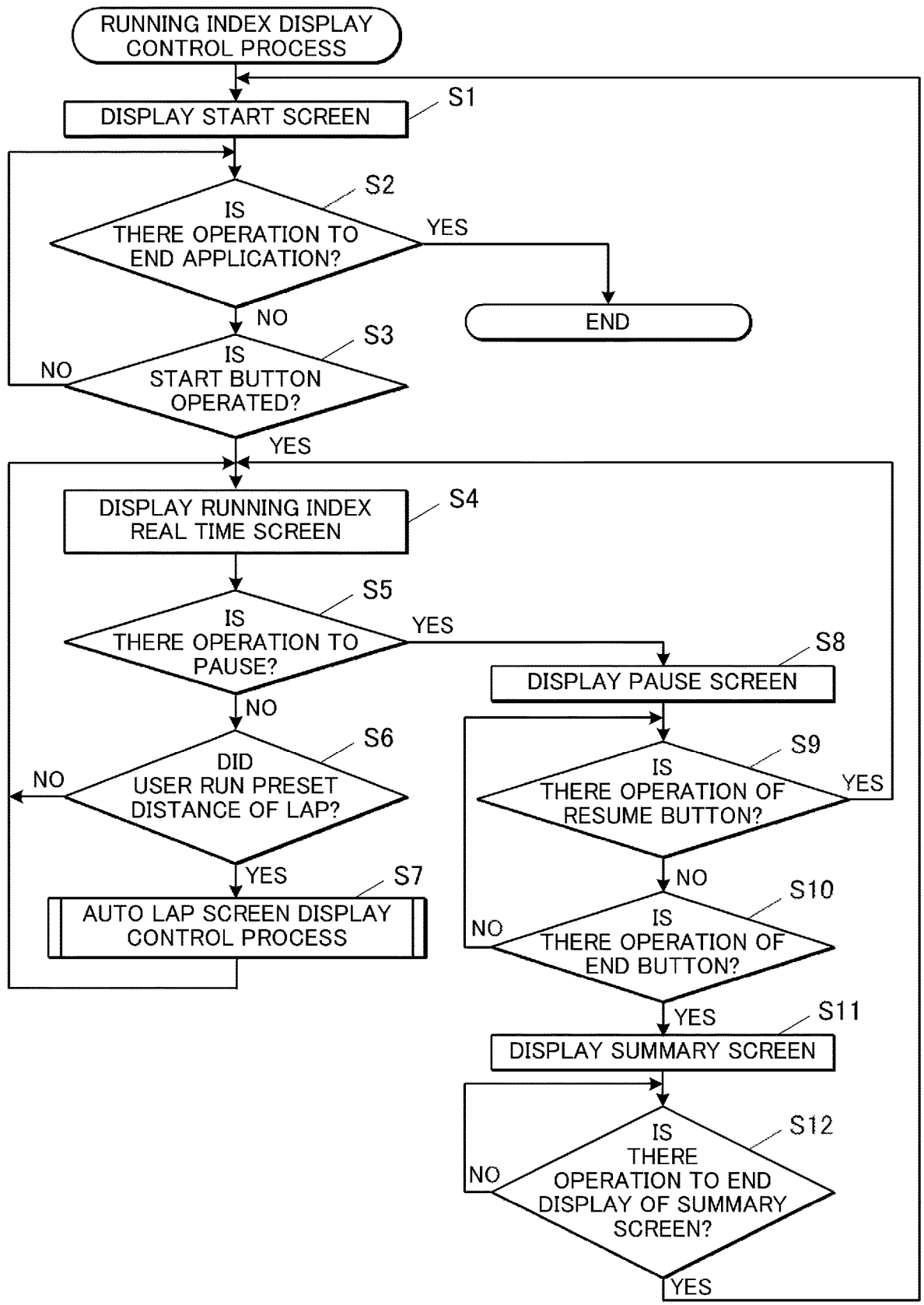
FIG. 3 is a flowchart showing a control procedure of a running index display control process.

FIG. 3 is a flowchart showing a control procedure of a running index display control process. The running index display control process is a process that is started when the user operates and starts the running application stored in the storage 13 of the main body 1.

[Running Index Display Control Process]

As shown in FIG. 3, when the running index display control process starts, the CPU 11 displays a start screen 31 on the display 15 (step S1).

Figure 4:
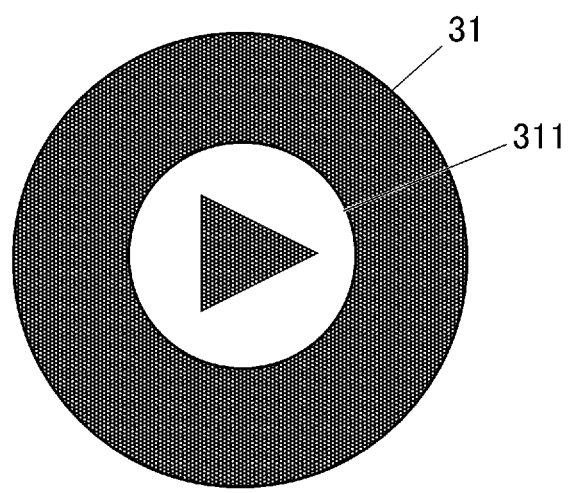
FIG. 4 is a diagram showing an example of a start screen.

FIG. 4 is a diagram showing an example of a start screen 31.

In the start screen 31, the start button 311 to instruct that the runner will start running is displayed in the center of the screen.

Next, the CPU 11 determines whether a predetermined operation (for example, swipe operation to the right direction on the display 15) to end the running application is performed (step S2).

In step S2, when it is determined that a predetermined operation to end the running application (step S2; YES) is performed, the CPU 11 ends the running index display control process. When the running index display control process ends, for example, the mode of the apparatus switches to a watch mode that displays the present time on the display 15.

In step S2, when it is determined that the predetermined operation to end the running application is not performed (step S2; NO), the CPU 11 determines whether an operation to touch the start button 311 is performed (step S3).

In step S3, when it is determined that the operation to touch the start button 311 is not performed (step S3; NO), the CPU 11 returns the process to step S2, and repeats the process thereafter.

On the other hand, in step S3, when it is determined that the operation to touch the start button 311 is performed (step S3; YES), the CPU 11 displays a running index real time screen 32 on the display 15 (step S4).

Figure 5:
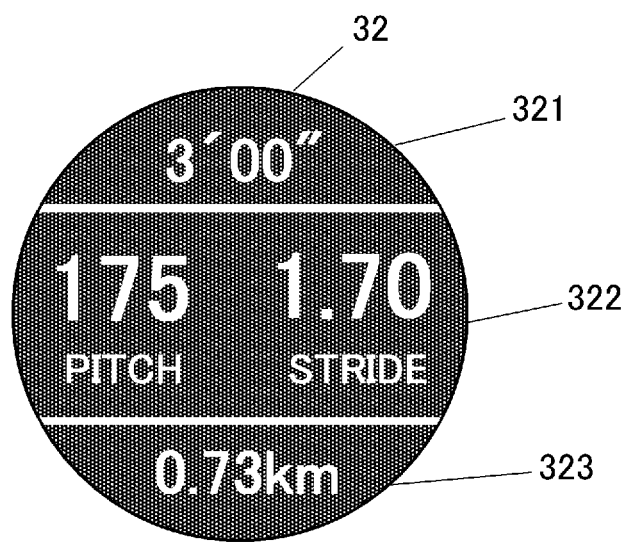
FIG. 5 is a diagram showing an example of a running index real time screen.

FIG. 5 is a diagram showing an example of a running index real time screen 32.

In the running index real time screen 32, a first display region 321 is provided in an upper part of the screen, a second display region 322 is provided in a middle part of the screen, and a third display region 323 is provided in a lower part of the screen.

In the first display region 321, the present pace (the pace showing how many minutes and how many seconds the runner is running a preset running target distance (for example, 1 km)) which is the running index is displayed in real time. The example in FIG. 5 shows that the runner is running at a pace of 3 minutes 00 seconds per kilometer. Here, the pace is derived based on the position information sequentially obtained from the GPS receiver of the sensor 18.

In the second display region 322, a pitch and a stride which are running indices are displayed in real time. The example in FIG. 5 shows that the user's current pitch is 175 (steps/minute) and the stride is 1.70 (m). Here, the pitch and the stride are derived based on acceleration data sequentially obtained from the 3-axis acceleration sensor of the sensor 18 and the position information sequentially obtained from the GPS receiver.

The displayed running index is not limited to the pitch and the stride, and various other running indices may be displayed, for example, stride/height ratio, ground stride/height ratio, air stride/height ratio, ground time, air time, ground time percentage, air time percentage, vertical movement, horizontal movement, braking, propulsion, sinking, sinking time, forward lean angle, horizontal angle, rotating angle (pitch), rotating angle (yaw), rotating angle (low), force product, and the like.

The displayed running indices are not limited to 2, and 1 or at least 2 running indices may be displayed.

The displayed running indices can be selected based on the user operation.

In the third display region 323, the running distance from the point where the start button 311 is touched is displayed. The example in FIG. 5 shows running 0.73 km from the point where the start button 311 is touched. Here, the running distance is derived based on the position information, etc. sequentially obtained from the GPS receiver of the sensor 18.

Returning to the description of the running index display control process, the CPU 11 determines whether an operation to pause (for example, the first operation button 141 is pressed or the display 15 is pressed for a long time) is performed in a state in which the running index real time screen 32 is displayed on the display 15 (step S5).

In step S5, when it is determined that it is not paused (step S5; NO), the CPU 11 determines whether the user ran the preset distance of the lap (predetermined distance) (step S6). Here, lap means a section that is to be a rough standard during running, for example, when the unit of the lap is set to "1 km" and the running target distance is set to "40 km" based on the user operation in advance, each time the user passes the points 1 km, 2 km, 3 km, . . . , 40 km at every 1 km, the CPU 11 determines that the user ran the preset distance of the lap.

In step S6, when it is determined that the user did not run the preset distance of the lap (step S6; NO), the CPU 11 returns the process to step S4, and repeats the process thereafter.

In step S6, when it is determined that the user ran the preset distance of the lap (step S6; YES), after performing an auto lap screen display control process (step S7), the CPU 11 returns the process to step S4 and repeats the process thereafter. The details of the auto lap screen display control process are described later.

In step S5, when it is determined that pause is operated (step S5; YES), the CPU 11 displays on the display 15 a pause screen 33 (step S8).

Figure 6:
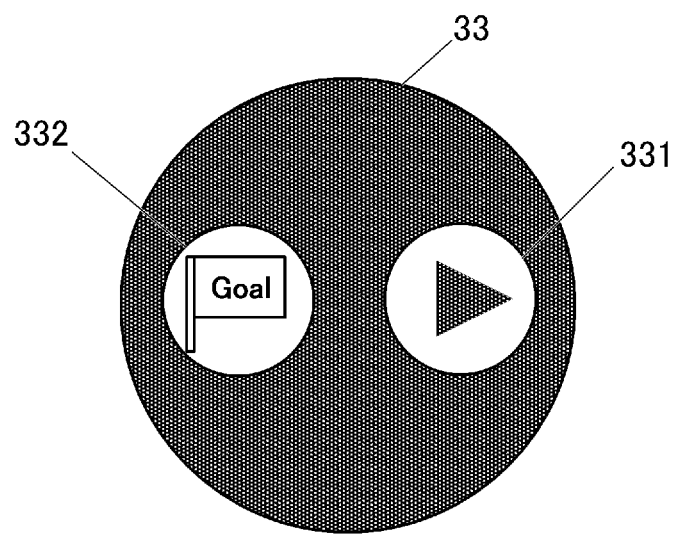
FIG. 6 is a diagram showing an example of a pause screen.

FIG. 6 is a diagram showing an example of the pause screen 33.

In the pause screen 33, a resume button 331 to release the state of the pause is displayed on the right side of the screen, and the end button 332 to notify the end of the running is displayed on the left side of the screen.

The CPU 11 determines whether the resume button 331 is touched in a state in which the pause screen 33 is displayed on the display 15 (step S9).

In step S9, when it is determined that the resume button 331 is touched (step S9; YES), the CPU 11 returns to the process in step S4, and repeats the process thereafter.

In step S9, when it is determined that the resume button 331 is not touched (step S9; NO), the CPU 11 determines whether the end button 332 is touched (step S10).

In step S10, when it is determined that the end button 332 is not touched (step S10; NO), the CPU 11 returns to the process in step S9, and repeats the process thereafter.

In step S10, when it is determined that the end button 332 is touched (step S10; YES), the CPU 11 displays a summary screen 34 showing the measured result regarding the running by the user on the display 15 (step S11).

Figure 7:
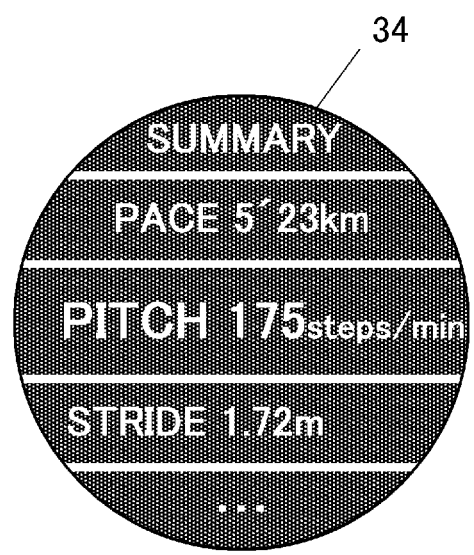
FIG. 7 is a diagram showing an example of a summary screen.

FIG. 7 is a diagram showing an example of the summary screen 34.

In the summary screen 34, data of the following items are displayed as the measured result regarding the running by the user, for example, pace, pitch, stride, and the like.

The CPU 11 determines whether the predetermined operation (for example, swipe to the right direction on the display 15) in order to transition to the start screen 31 is performed in a state in which the summary screen 34 is displayed on the display 15 (step S12).

In step S12, when it is determined that the predetermined operation to transition to the start screen 31 is not performed (step S12; NO), the CPU 11 repeats the process in step S12 until it is determined that the predetermined operation is performed.

On the other hand, in step S12, when it is determined that the predetermined operation to transition to the start screen 31 is performed (step S12; YES), the CPU 11 returns to the process in step S1 and repeats the process thereafter.

[Auto Lap Screen Display Control Process]

Next, an auto lap screen display control process is described with reference to FIG. 8.

Figure 8:
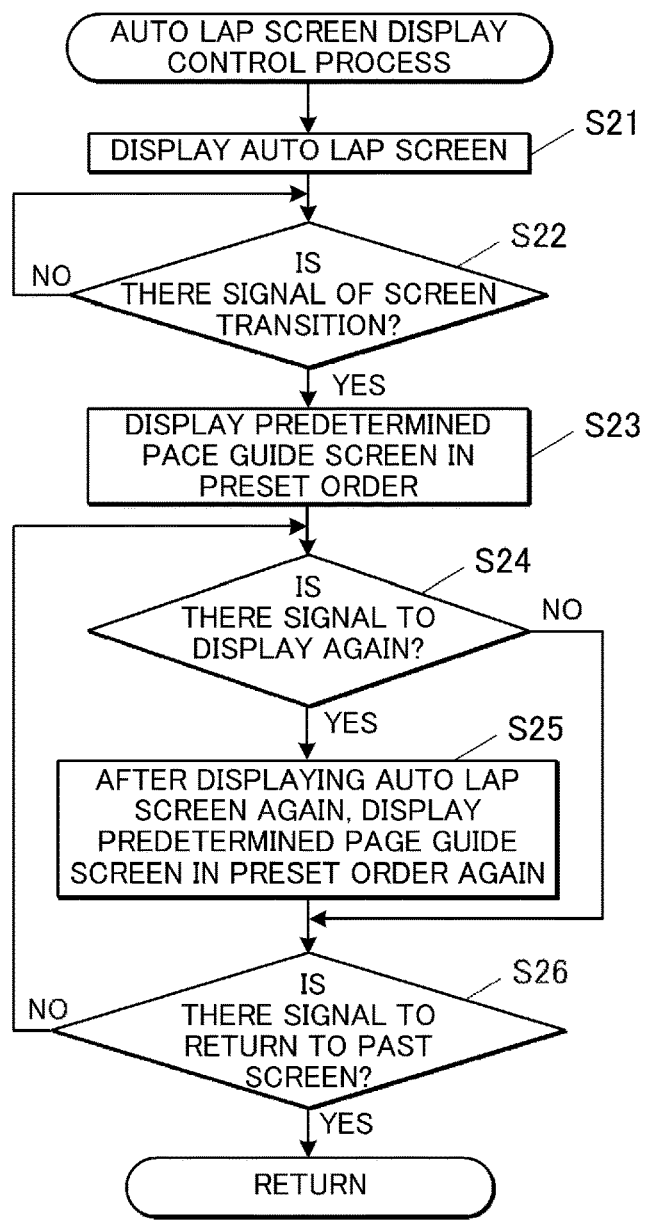
FIG. 8 is a flowchart showing a control procedure of an auto lap screen display control process.

FIG. 8 is a flowchart showing a detailed control procedure of step S7 in the running index display control process shown in FIG. 3.

As shown in FIG. 8, when the auto lap screen display control process starts, the CPU 11 displays an auto lap screen 35 on the display 15 (step S21).

Figure 9:
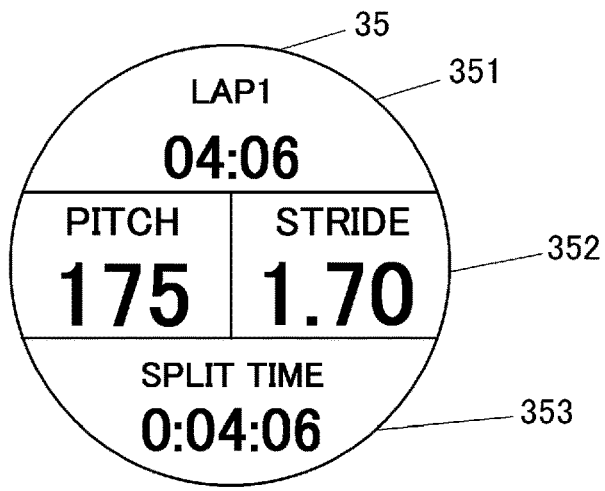
FIG. 9 is a diagram showing an example of an auto lap screen.

FIG. 9 is a diagram showing an example of the auto lap screen 35.

In the auto lap screen 35, a first display region 351 is provided in the upper part of the screen, a second display region 352 is provided in the middle part of the screen, and a third display region 353 is provided in the lower part of the screen. Moreover, in the above-described running index real time screen 32, the background may be displayed with black, for example, whereas in the auto lap screen 35, the background may be displayed with white. Therefore, it is possible for the runner to easily understand whether the present display is the running index real time screen 32 or the auto lap screen 35.

In the first display region 351, the number of laps and the most recent lap time are displayed. The example in FIG. 9 shows the number of laps is 1 lap and the most recent lap time is 4 minutes 06 seconds.

In the second display region 352, the average value of the pitch and the stride in the most recent lap section is displayed. The example in FIG. 9 shows that the average value of the pitch in the most recent lap section is 175 (steps/minute) and the average value of the stride is 1.70 (m).

Here, the average value of the pitch and the stride in the lap section is displayed because the value of the running index at real time (short time interval) changes and it is difficult to understand the present running state. For example, generally, when the running distance becomes long (the runner becomes tired), the stride becomes smaller (decreases) and the time becomes a slow time. In real time (short time interval), the stride gradually becomes lower (decreases) and it is difficult for the runner to understand the present state. In contrast, considering the average value in the lap section, it is clear that the stride gradually becomes smaller (decreases), and the present running state becomes easy to understand.

In the third display region 353, the elapsed time from the start point to the present lap point is displayed with a so-called split time. According to the example in FIG. 9, the split time is shown as 4 minutes 06 seconds.

Returning to the description in the auto lap screen display control process, the CPU 11 determines whether there is a signal to transition the screen in the state in which the auto lap screen 35 is displayed on the display 15 (step S22). Specifically, for example, when the swipe operation in the upward direction or tap operation is performed on the display 15, or when a predetermined amount of time (for example, 4 seconds) passes after the auto lap screen 35 is displayed on the display 15, the CPU 11 determines that there is a signal to perform screen transition.

In step S22, when it is determined that there is no signal to perform screen transition (step S22; NO), the CPU 11 repeats the process in step S22 until it is determined that there is the signal to perform screen transition.

In step S22, when it is determined that there is the signal to perform screen transition (step S22; YES), the CPU 11 displays on the display 15 in a preset order a plurality of different types of pace distribution patterns (hereinafter referred to as pace guide screen) showing a pace distribution that reaches the goal point at a target time, for example, predetermined pace guide screens among first to fourth pace guide screens 36 to 39 (step S23).

FIG. 10A to FIG. 10D are diagrams showing examples of the first to fourth pace guide screens 36 to 39.

Figure 10A:
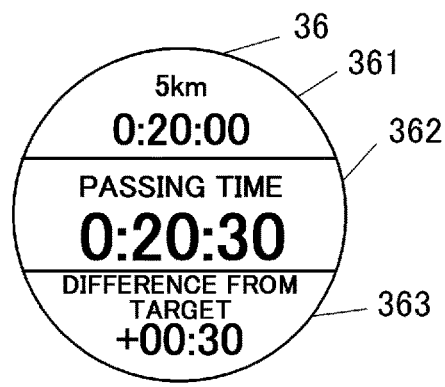
FIG. 10A is a diagram showing an example of a first pace guide screen.

As shown in FIG. 10A, in the first pace guide screen 36, a first display region 361 is provided in the upper part of the screen, a second display region 362 is provided in the middle part of the screen, and a third display region 363 is provided in the lower part of the screen.

In the first display region 361, the distance from the start point to the predetermined passing point and the target time at the predetermined passing point are displayed. In the example shown in FIG. 10A, the distance from the starting point to the passing point is 5 km, and the target time at the passing point is shown to be 20 minutes 00 seconds. Here, the predetermined passing point means, for example, a point that is a multiple of 5 km. That is, the first pace guide screen 36 is displayed on the display 15 only when the runner runs a preset distance of the lap and passes a point that is a multiple of 5 km (5 km, 10 km, 15 km, . . . ). Moreover, the distance from the start point to the passing point is derived based on the position information sequentially obtained from the GPS receiver of the sensor 18. The target time at the passing point is derived based on the running target distance set in advance according to user operation and the target time when the runner runs the running target distance.

In the second display region 362, the time that the user actually passed the passing point is displayed. The example shown in FIG. 10A shows that the point of 5 km (passing point) is passed at 20 minutes 30 seconds.

In the third display region 363, the difference between the target time at the passing point and the actual time at the passing point is displayed. The example in FIG. 10A shows that the difference between the target time at the point of 5 km (20 minutes 00 seconds) and the actual time (20 minutes 30 seconds) is +30 seconds. Here, when the actual time is slower than the target time, the character "+" is added to the beginning of the difference of the above time. On the other hand, when the actual time is faster than the target time, the character "−" is added to the beginning of the difference of the above time.

Figure 10B:
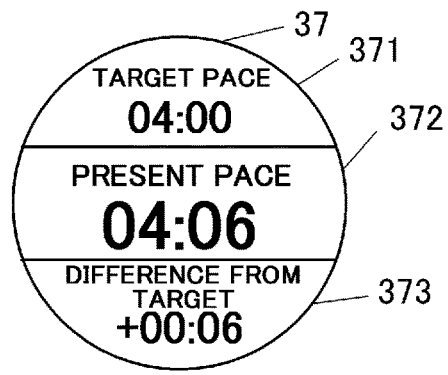
FIG. 10B is a diagram showing an example of a second pace guide screen.

As shown in FIG. 10B, in the second pace guide screen 37, a first display region 371 is provided in the upper part of the screen, a second display region 372 is provided in the middle part of the screen, and a third display region 373 is provided in the lower part of the screen.

In the first display region 371, the target pace is displayed. The example in FIG. 10B shows the target pace is 4 minutes 00 seconds. Here, the target pace is the pace (even pace) in order to reach the target time when the user runs a preset running target distance (for example, 1 km) that is set in advance by user operation.

In the second display region 372, the user's present pace is displayed. The example in FIG. 10B shows the user's present pace is 4 minutes 06 seconds. Here, the present pace displayed in the second display region 372 is the average pace of the most recent lap section.

In the third display region 373, the difference between the target pace and the present pace is displayed. The example shown in FIG. 10B shows that the difference between the target pace and the present pace is +6 seconds. Here, when the present pace is slower than the target pace, the character "+" is added to the beginning of the difference of the above pace. On the other hand, when the present pace is faster than the target pace, the character "−" is added to the beginning of the difference of the above pace.

Figure 10C:
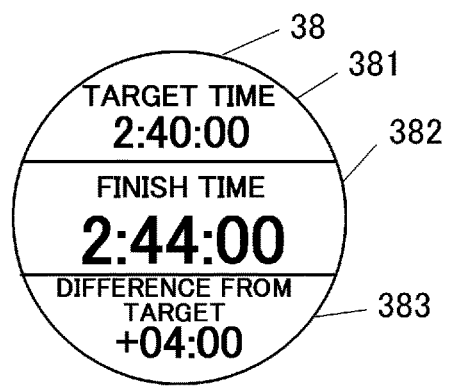
FIG. 10C is a diagram showing an example of a third pace guide screen.

As shown in FIG. 10C, in the third pace guide screen 38, a first display region 381 is provided in the upper part of the screen, a second display region 382 is provided in the middle part of the screen, and a third display region 383 is provided in the lower part of the screen.

In the first display region 381, the target time when the user runs the running target distance set in advance according to user operation is displayed. The example shown in FIG. 10C shows the target time is 2 hours 40 minutes 00 seconds.

In the second display region 382, the finish time when the user runs the running target distance maintaining the present pace is displayed. The example shown in FIG. 10C shows that the finish time is 2 hours 44 minutes 00 seconds.

In the third display region 383, the difference between the above-described target time and the finish time is displayed. The example shown in FIG. 10C shows that the difference between the target time and the finish time is +4 minutes 00 seconds. Here, when the finish time is slower than the target time, the character "+" is added to the beginning of the difference of the above time. On the other hand, if the finish time is faster than the target time, the character "−" is added to the beginning of the difference of the above time.

Figure 10D:
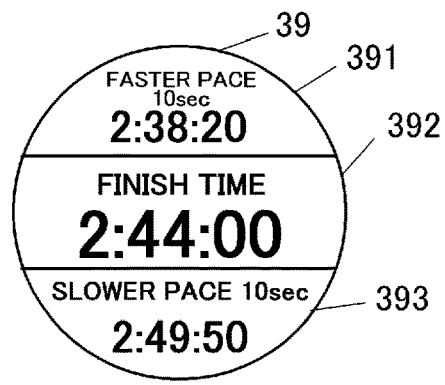
FIG. 10D is a diagram showing an example of a fourth pace guide screen.

As shown in FIG. 10D, in the fourth pace guide screen 39, a first display region 391 is provided in the upper part of the screen, a second display region 392 is provided in the middle part of the screen, and a third display region 393 is provided in the lower part of the screen.

In the first display region 391, the finish time when the runner runs at a pace a predetermined amount of time faster than the present pace is displayed. The example shown in FIG. 10D shows that when the runner runs at the pace 10 seconds faster than the present pace, the finish time is 2 hours 38 minutes 20 seconds. Moreover, when the predetermined operation (for example, double tap operation) is performed on the first display region 391, a faster-pace degree change screen 40 in which the runner is able to change the degree that the pace is made faster is displayed on the display 15. The details of the faster-pace degree change screen 40 are described later.

In the second display region 392, similar to the third pace guide screen 38, the finish time when the user runs the running target distance maintaining the present pace is displayed. The example shown in FIG. 10D shows the finish time is 2 hours 44 minutes 00 seconds.

In the third display region 393, the finish time when the runner runs at a pace a predetermined amount of time slower than the present pace is displayed. The example shown in FIG. 10D shows that the finish time when the runner runs at the pace 10 seconds slower than the present pace is 2 hours 49 minutes 50 seconds. When a predetermined operation (for example, double tap operation) is performed on the third display region 393, a slower-pace degree change screen 41 in which the runner is able to change the degree that the pace is made slower is displayed on the display 15. The details of the slower-pace degree change screen 41 are described later.

Next, the screen transition when the predetermined pace guide screens are displayed in the preset order on the display 15 in step S23 is described with reference to FIG. 11 and FIG. 12.

Figure 11:
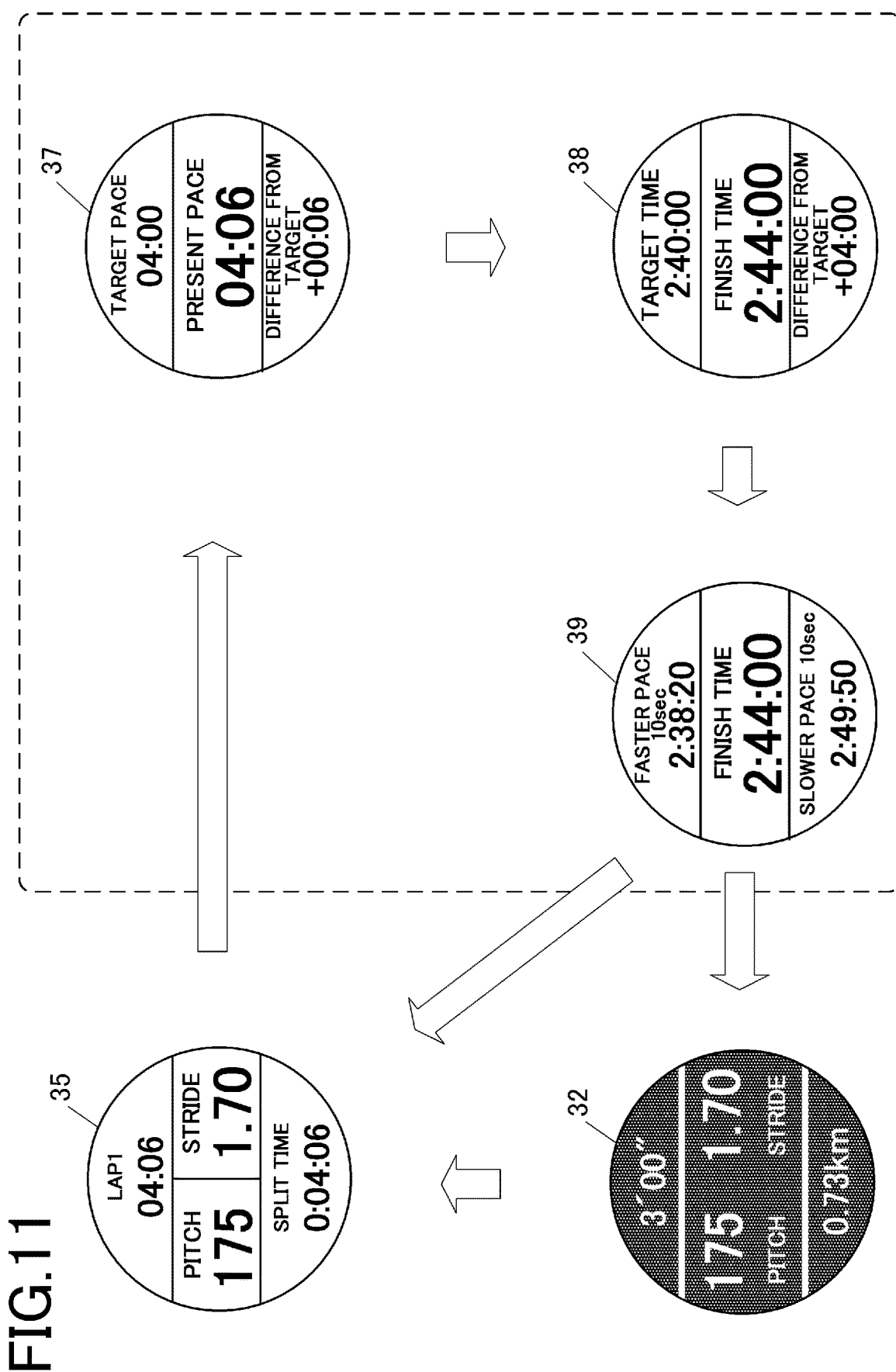
FIG. 11 is a diagram showing an example of transitions of pace guide screens.

FIG. 11 is a diagram showing an example of the screen transition when the above-described conditions to display the first pace guide screen 36 are not satisfied, that is, when the condition that the runner ran a preset distance of the lap and the runner passed a predetermined passing point, for example, the point that is the multiple of 5 km is not satisfied.

As shown in FIG. 11, in such case, when the user runs the preset distance of the lap (for example, 1 km) in a state in which the running index real time screen 32 is displayed on the display 15, the screen transitions from the running index real time screen 32 to the auto lap screen 35.

Next, when the auto lap screen 35 is displayed on the display 15, when there is the above-described screen transition signal, the screen transitions from the auto lap screen 35 to the second pace guide screen 37.

Next, in the state in which the second pace guide screen 37 is displayed on the display 15, when there is the above-described screen transition signal, the screen transitions from the second pace guide screen 37 to the third pace guide screen 38.

Next, when there is the above-described screen transition signal in the state in which the third pace guide screen 38 is displayed on the display 15, the screen transitions from the third pace guide screen 38 to the fourth pace guide screen 39.

Next, when the predetermined amount of time (for example, 5 seconds) passes in the state in which the fourth pace guide screen 39 is displayed on the display 15, the screen transitions from the fourth pace guide screen 39 to the running index real time screen 32. When the runner performs the swipe operation in the upward direction or the tap operation on the display 15 in the state in which the fourth pace guide screen 39 is displayed on the display 15, after the auto lap screen 35 is displayed again on the display 15, the second pace guide screen 37, the third pace guide screen 38, and the fourth pace guide screen 39 are displayed sequentially on the display 15. When the runner performs the swipe operation in the downward direction on the display 15 in the state in which any screen among the auto lap screen 35, the second pace guide screen 37, the third pace guide screen 38, and the fourth pace guide screen 39 are displayed on the display 15, the screen transitions from any of the above screens being displayed to the running index real time screen 32.

Figure 12:
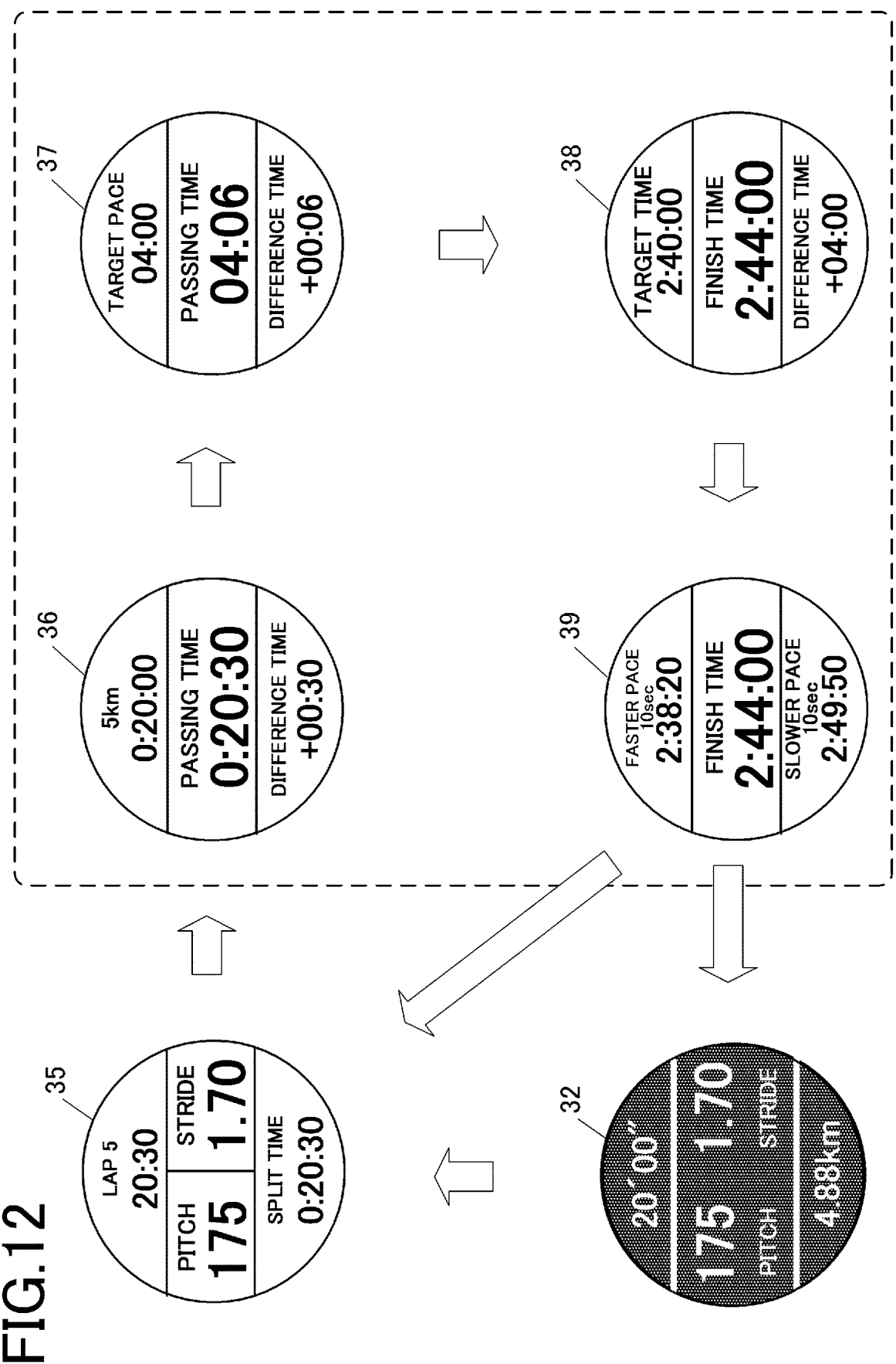
FIG. 12 is a diagram showing an example of transitions of pace guide screens.

FIG. 12 is a diagram showing an example of screen transition when the conditions to display the above-described first pace guide screen 36 are satisfied.

As shown in FIG. 12, in this case, similar to the example shown in FIG. 11, when the user runs the preset distance of the lap (for example, 1 km) in a state in which the running index real time screen 32 is displayed on the display 15, the screen transitions from the running index real time screen 32 to the auto lap screen 35.

Next, when there is the above described signal to transition the screen in the state in which the auto lap screen 35 is displayed on the display 15, the screen transitions from the auto lap screen 35 to the first pace guide screen 36.

Next, in the state in which the first pace guide screen 36 is displayed on the display 15, when there is the above described signal to transition the screen, the screen transitions from the first pace guide screen 36 to the second pace guide screen 37. The screen transitions performed after the above are the same as the example shown in FIG. 11, and the description is omitted.

Returning to the description of the auto lap screen display control process, when all of the predetermined pace guide screens are displayed on the display 15, the CPU 11 determines whether there is a signal to display the screens again (for example, swipe operation in the upward direction or a tap operation on the display 15) in a state in which the last pace guide screen (for example, the fourth pace guide screen 39, see FIG. 11 and FIG. 12) is displayed on the display 15 (step S24).

In step S24, when it is determined that there is a signal to perform the display again (step S24; YES), after the auto lap screen 35 is displayed again on the display 15 in step S21, the CPU 11 displays the predetermined pace guide screens in the preset order again (step S25), and the process proceeds to step S26.

In step S24, when there is no signal to display the screens again (step S24; NO), the CPU 11 skips step S25 and the process proceeds to step S26.

Next, when the predetermined page guide screens are displayed in the preset order on the display 15, the CPU 11 determines whether there is a signal to return to the past screen (step S26). Specifically, for example, when all of the predetermined pace guide screens are displayed on the display 15, when a predetermined amount of time (for example, 5 seconds) passes in the state in which the last pace guide screen (for example, fourth pace guide screen 39, see FIG. 11 and FIG. 12) is displayed on the display 15, the CPU 11 determines whether there is the signal to return to the past screen. Also, when the swipe operation in the downward direction is performed on the display 15 in the state in which any among the predetermined pace guide screens are displayed on the display 15, the CPU 11 determines whether there is the signal to return to the past screen.

In step S26, when it is determined that there is no signal to return to the past screen (step S26; NO), the CPU 11 returns the process to step S24, and repeats the process thereafter. On the other hand, in step S26, when it is determined that there is the signal to return to the past screen (step S26; YES), the CPU 11 ends the auto lap screen display control process and returns the process to step S4 in the running index display control process.

Next, the above-described faster-pace degree change screen 40 and the slower-pace degree change screen 41 are described with reference to FIG. 13 and FIG. 14.

Figure 13A:
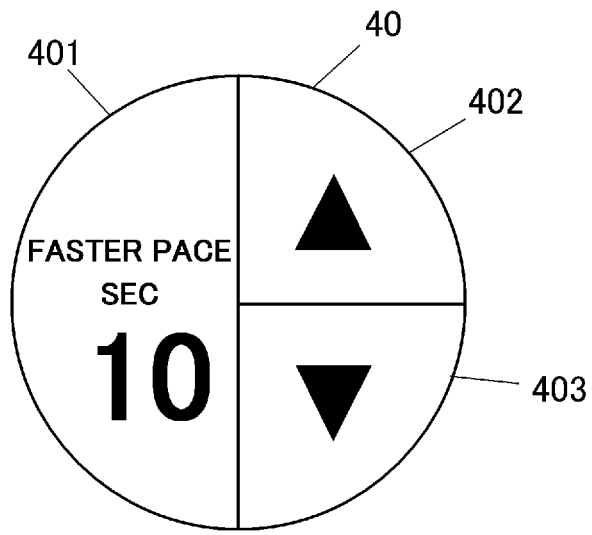
FIG. 13A is a diagram showing an example of a faster-pace degree change screen before changing a pace degree.

FIG. 13A shows an example of the faster-pace degree change screen 40 before changing the degree that the pace is made faster.

For example, in the state in which the fourth pace guide screen 39 shown in FIG. 10D is displayed on the display 15, when a predetermined operation (for example, double tap operation) is performed on the first display region 391, as shown in FIG. 13A, the faster-pace degree change screen 40 is displayed on the display 15.

In the faster-pace degree change screen 40, a faster-pace degree display region 401 is provided on the left half of the screen, the upper side region on the right half of the screen is to be an add button 402 and the lower side region on the right half of the screen is to be a subtract button 403. The add button 402 is a button to increase a value of "faster-pace sec" displayed on the faster-pace degree display region 401. The button is used so as to be able to increase this value up to the maximum value, for example, 30 seconds. The subtract button 403 is a button to decrease a value of "faster-pace sec" displayed on the faster-pace degree display region 401. The button is used so as to be able to decrease this value down to the minimum value that is 1 second. For example, when the swipe operation in the right direction is performed on the display 15 in the state in which the faster-pace degree change screen 40 is displayed on the display 15, the change in the degree that the pace is made faster is confirmed, and the fourth pace guide screen 39 reflecting the changed degree that the pace is made faster is displayed on the display 15. For example, when the add button 402 or the subtract button 403 is not operated for 5 seconds in the state in which the faster-pace degree change screen 40 is displayed on the display 15, the change in the degree that the pace is made faster is confirmed, and the fourth pace guide screen 39 reflecting the changed degree that the pace is made faster is displayed on the display 15.

Figure 13B:
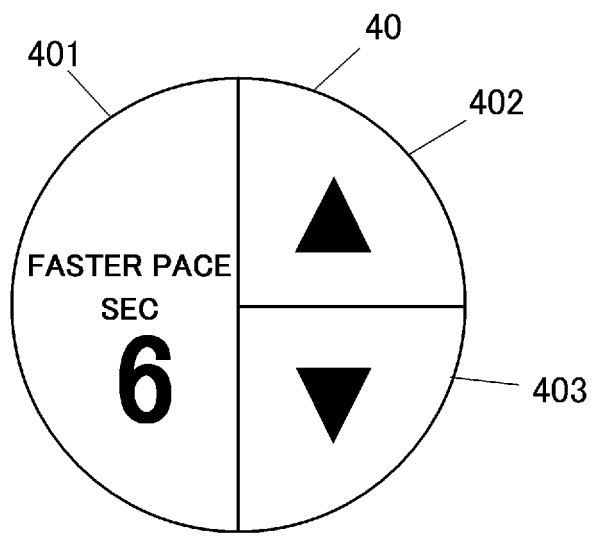
FIG. 13B is a diagram showing an example of the faster-pace degree change screen after changing the faster-pace degree.
Figure 15A:
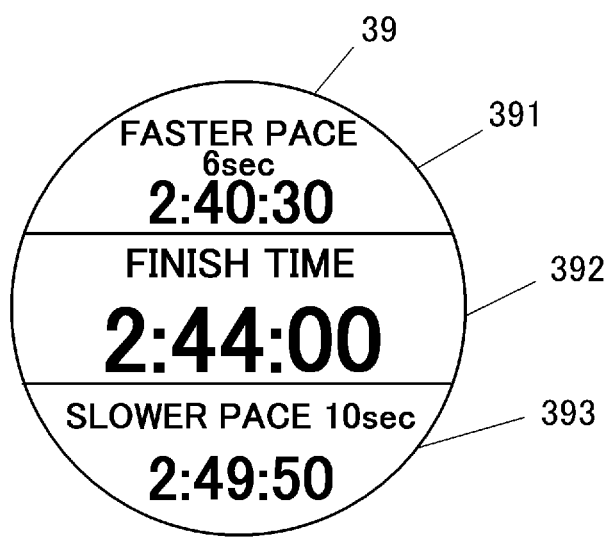
FIG. 15A is a diagram showing an example of the fourth pace guide screen in a state reflecting the faster-pace degree changed in the faster-pace degree change screen shown in FIG. 13B.

Specifically, for example, when the user successively taps the subtract button 403 4 times, as shown in FIG. 13B, the value of the "faster-pace sec" displayed in the faster-pace degree display region 401 is changed from "10" to "6", and when the user performs the swipe operation in the right direction on the display 15 in such state, the change in the degree that the pace is made faster is confirmed. As shown in FIG. 15A, the fourth pace guide screen 39 reflecting the changed degree that the pace is made faster is displayed on the display 15.

Figure 14A:
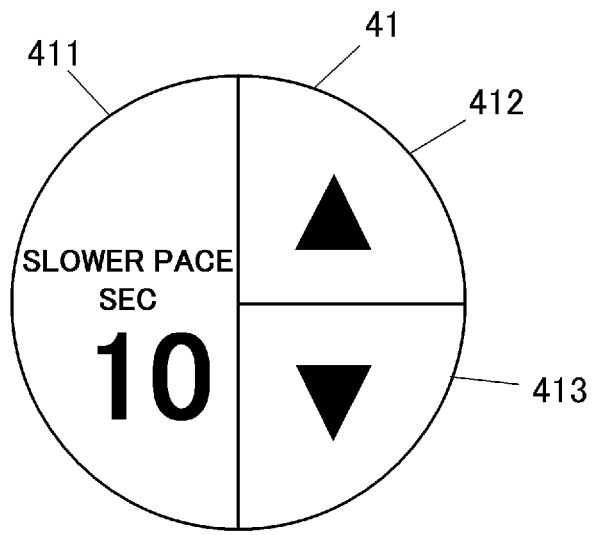
FIG. 14A is a diagram showing an example of a slower-pace degree change screen before changing the slower-pace degree.

FIG. 14A is a diagram showing an example of the slower-pace degree change screen 41 before changing the degree that the pace is made slower.

For example, when the predetermined operation is performed on the third display region 393 (for example, double tap operation) in the state in which the fourth pace guide screen 39 shown in FIG. 10D is displayed on the display 15, as shown in FIG. 14A, the slower-pace degree change screen 41 is displayed on the display 15.

In the slower-pace degree change screen 41, a slower-pace degree display region 411 is provided on the left half of the screen, the upper side region on the right half of the screen is to be an add button 412 and the lower side region on the right half of the screen is to be a subtract button 413. The add button 412 is a button to increase a value of "slower-pace sec" displayed on the slower-pace degree display region 411. The button is used to be able to increase this value up to the maximum value, for example, 30 seconds. The subtract button 413 is a button to decrease a value of "slower-pace sec" displayed on the slower-pace degree display region 411. The button is used to be able to decrease this value down to the minimum value that is 1 second. For example, when the swipe operation in the right direction is performed on the display 15 in the state in which the slower-pace degree change screen 41 is displayed on the display 15, the change in the degree that the pace is made slower is confirmed, and the fourth pace guide screen 39 reflecting the changed degree that the pace is made slower is displayed on the display 15. For example, when the add button 412 or the subtract button 413 is not operated for 5 seconds in the state in which the slower-pace degree change screen 41 is displayed on the display 15, the change in the degree that the pace is made slower is confirmed, and the fourth pace guide screen 39 reflecting the changed degree that the pace is made slower is displayed on the display 15.

Figure 14B:
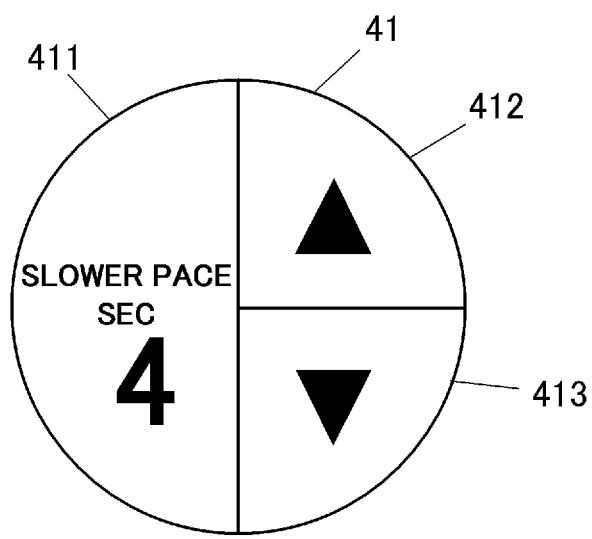
FIG. 14B is a diagram showing an example of the slower-pace degree change screen after changing the slower-pace degree.
Figure 15B:
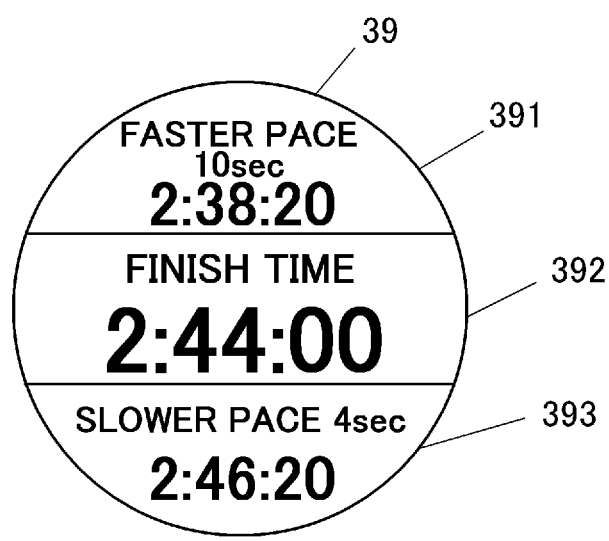
FIG. 15B is a diagram showing an example of the fourth pace guide screen in a state reflecting the slower-pace degree changed in the slower-pace degree change screen shown in FIG. 14B.

Specifically, for example, when the user successively taps the subtract button 413 6 times, as shown in FIG. 14B, the value of the "slow-pace sec" displayed in the slower-pace degree display region 411 is changed from "10" to "4", and when the user performs the swipe operation in the right direction on the display 15 in such state, the change in the degree that the pace is made slower is confirmed. As shown in FIG. 15B, the fourth pace guide screen 39 reflecting the changed degree that the pace is made slower is displayed on the display 15.

As described above, according to the running watch 100 of the present embodiment, based on the exercise data obtained when the user is running, the pace that the runner is running the preset distance between the start point and the goal point is derived. Based on the derived pace, the estimated goal time (finish time) that the runner reaches the preset goal point is derived. Moreover, the faster-pace estimated goal time (finish time) when the runner reaches the goal point in a state with the pace made a predetermined amount of time faster and a the slower-pace estimated goal time (finish time) when the runner reaches the goal point in a state with the pace made a predetermined amount of time slower are derived. The above derived estimated goal time, faster-pace estimated goal time, and slower-pace estimated goal time are displayed on the display 15.

Therefore, according to the running watch 100, the estimated goal time, the faster-pace estimated goal time, and the slower-pace estimated goal time are displayed on the display 15. With this, even if the user who is the runner changes the pace during the marathon race, the user is able to understand the time that the user reaches the goal point.

When the faster-pace estimated goal time is displayed on the display 15, in a case in which the running watch 100 accepts the input operation in order to change the pace when the faster-pace estimated goal time is derived and the input operation that changes the pace is accepted, based on the changed pace, the faster-pace estimated goal time is derived and the derived faster-pace estimated goal time that is changed is displayed on the display 15.

Therefore, according to the running watch 100, the runner is able to understand the time that the user reaches the goal point when the user runs at the pace that is made faster so as to be the desired pace.

When the slower-pace estimated goal time is displayed on the display 15, in a case in which the running watch 100 accepts the input operation in order to change the pace when the slower-pace estimated goal time is derived and the input operation that changes the pace is accepted, based on the changed pace, the slower-pace estimated goal time is derived and the derived slower-pace estimated goal time that is changed is displayed on the display 15.

Therefore, according to the running watch 100, the runner is able to understand the time that the user reaches the goal point when the user runs at the pace that is made slower so as to be the desired pace.

The running watch 100 determines whether the user ran a predetermined distance based on the exercise data obtained when the user is running, and each time it is determined that the user ran the predetermined distance, the pace that the user is running at the determined point is derived.

Therefore, according to the running watch 100, each time it is determined that the user ran the predetermined distance, it is possible to display the estimated goal time, the faster-pace estimated goal time, and the slower-pace estimated goal time on the display 15.

As a result, even when the user changes the pace each time the user runs a predetermined distance, the user is able to understand the time that the user reaches the goal point.

Generally, when the runner participates in a marathon race, the runner sets a target time to reach the goal point and obtains in advance within how much time the runner needs to run a predetermined distance in order to beat the target time (for example, in order to finish a full marathon that is 42.195 km in 4 hours 00 minutes, the runner needs to run 1 km at a pace of about 5 minutes 41 seconds). Then, the runner takes on the race.

However, even if the runner attempts to run at the obtained pace, due to weather conditions on the day of the race or the runner's physical conditions, there are many occasions that the runner may be able to run faster than the obtained pace or may not be able to run at the obtained pace. However, according to the portable apparatus disclosed in JP H10-332414, if such a situation occurs, the runner cannot know the time that the runner reaches the goal point if the runner changes the pace.

On the other hand, according to the present disclosure, even if the runner changes the pace during the marathon race, the runner is able to know the time that the runner reaches the goal point.

The description in the above embodiments are one example of the estimated goal time display apparatus according to the present disclosure and the present disclosure is not limited to the above.

For example, the running index display control process (see FIG. 3) according to the present embodiment can be performed using the estimated goal time display system according to the present disclosure. Such estimated goal time display system includes the running watch 100 described in the above embodiment and a measurement recording apparatus (exercise data obtaining apparatus). In the estimated goal time display system, the running watch 100 receives the exercise data (exercise data obtained when the user is running) sequentially transmitted from the measurement recording apparatus and derives various information displayed on the running index real time screen 32, summary screen 34, auto lap screen 35, and the first to fourth pace guide screens 36 to 39 based on the received exercise data.

Here, the measurement recording apparatus includes a sensor that is similar to the sensor 18 included in the running watch 100, and the user is able to sequentially obtain the acceleration data and the position data in the 3-axis direction obtained from the sensor while the user is running. For example, the measurement recording apparatus is attached to a position at the waist of the user and used. When the estimated goal time display system is used, first, for example, between the running watch 100 and the measurement recording apparatus, a communication setting process called pairing is performed in advance. With this, device information and authentication key data are exchanged by wireless signals. This is performed so that the near field communication by BLE (Bluetooth (registered trademark) Low Energy) can be performed smoothly between the running watch 100 and the measurement recording apparatus even if the communication setting processing is not performed each time.

The measurement recording apparatus may derive various information displayed on the running index real time screen 32, the summary screen 34, the auto lap screen 35, and the first to fourth pace guide screens 36 to 39 based on the exercise data obtained in the apparatus. Then, the measurement recording apparatus transmits the derived various information to the running watch 100. The running watch 100 receives various information transmitted from the measurement recording apparatus. Then, the various information is displayed on the running index real time screen 32, the summary screen 34, the auto lap screen 35, and the first to fourth pace guide screens 36 to 39. In such case, information such as the lap unit (distance of the lap), running target distance, target time, and the like are also obtained by the measurement storing apparatus.

According to the above embodiment, in the second display region 352 of the auto lap screen 35, the average value of the pitch and the stride in the most recent lap section is displayed. However, it is not limited to the most recent lap section, and for example, the average values of the pitch and the stride between the start point and the user's present position and the most recent predetermined distance (for example, 400 m) may be displayed. Alternatively, the average values of the pitch and the stride in the distance that the user is actually running without waking in the most recent lap section may be displayed. Alternatively, the average values of the pitch and the stride in the distance that the user is running at a predetermined speed or faster in the most recent lap section may be displayed.

According to the above embodiment, in the second display region 322 of the running index real time screen 32, the pitch and the stride which are the running indices are displayed in real time. In addition to the above, for example, the pitch when kicked with the left foot and the pitch when kicked with the right foot can be displayed aligned, or the stride when kicked with the left foot and the stride when kicked with the right foot may be displayed aligned.

According to the above embodiment, in the example of the screen transition shown in FIG. 12, the pace guide screens are displayed on the display 15 in the following order, first pace guide screen 36, second pace guide screen 37, third pace guide screen 38, and fourth pace guide screen 39. Alternatively, for example, the order that the pace guide screens are displayed on the display 15 may be set based on the user operation. Moreover, the pace guide screen that is displayed on the display 15 may be selected based on user operation. For example, only the first pace guide screen 36 and the second pace guide screen 37 or only the first pace guide screen 36 and the third pace guide screen 38 may be selected and displayed.

According to the above embodiment, in the second display region 372 of the second pace guide screen 37, the present pace of the user is displayed by displaying the average pace of the most recent lap section. The value is not limited to the above and for example, the average pace of the most recent predetermined distance (for example, 400 m) may be displayed. Here, the predetermined distance may be set based on the user operation.

Further, the average pace from the start point to the present point may be displayed.

According to the above embodiment, the first display region 391 of the fourth pace guide screen 39 displays the finish time when the user runs at a pace a predetermined amount of time faster than the present pace, and the third display region 393 displays the finish time when the user runs at a pace a predetermined amount of time slower than the present pace. Alternatively, for example, the third display region 393 may display the finish time when the user runs at a faster pace at a degree different from that shown in the first display region 391. Specifically, for example, the first display region 391 displays the finish time when the user runs at a pace 10 seconds faster and the third display region 393 displays the finish time when the user runs at a pace 5 seconds faster.

According to the above embodiment, for the purpose of preventing erroneous operation by the user, the background color when the faster-pace degree change screen 40 is displayed on the display 15 may be different from the background color when the slower-pace degree change screen 41 is displayed on the display 15.

According to the above embodiment, the target difference in the third display regions 363, 373, 383 in the first to third pace guide screens 36 to 38 are displayed. Alternatively, for example, when the value of the target difference exceeds the preset upper limit value or falls below the lower limit value, a beep sound may be output, the screen of the display 15 may flash or vibration may be started.

In the above embodiments, the user may be able to switch based on user operation whether to set the section (time) used to calculate the various running indices to be the section (time) including the sections (time) in which the user is walking or stopping, or to be the section (time) not including the sections (time) in which the user is walking or stopping.

In the above embodiment, the running watch 100 is to be a wristwatch. Alternatively, the running watch 100 may be a smartphone type, and may be used fixed on the user's upper arm with an arm band for smartphones.

INDUSTRIAL APPLICABILITY

The present disclosure can provide an estimated goal time display apparatus, an estimated goal time display control method, a program, and an estimated goal time display system that can determine the time that the runner reaches the goal point even if the runner changes his/her pace during a marathon race.

The invention claimed is:

1. An estimated goal time display system comprising:
   at least one processor; and
   at least one memory,
   wherein the at least one processor is configured to perform the following according to a program stored in the at least one memory:
   first deriving that derives a pace that a user runs a predetermined distance between a start point and a predetermined goal point, based on exercise data obtained while the user is running between the start point and the goal point, the predetermined distance being smaller than a total distance between the start point and the goal point;
   second deriving that derives, based on the pace derived in the first deriving, (i) an estimated goal time at which the user will reach the goal point, (ii) a faster-pace estimated goal time at which the user will reach the goal point if the user increases the pace by a predetermined amount, and (iii) a slower-pace estimated goal time at which the user will reach the goal point if the user reduces the pace by a predetermined amount;
   display controlling that displays, on a display, all of the estimated goal time, the faster-pace estimated goal time, and the slower-pace estimated goal time derived in the second deriving.

2. The estimated goal time display system according to claim 1, wherein the at least one processor is configured to perform a first accepting of an input operation to change the pace when the faster-pace estimated goal time is derived when the faster-pace estimated goal time is displayed on the display,
   wherein in the second deriving, the faster-pace estimated goal time is derived based on the changed pace when the input operation to change the pace is accepted in the first accepting, and
   wherein in the display controlling, the changed faster-pace estimated goal time derived in the second deriving is displayed.

3. The estimated goal time display system according to claim 2, wherein at least one the processor is configured to perform a second accepting of an input operation to change the pace when the slower-pace estimated goal time is derived when the slower-pace estimated goal time is displayed on the display,
   wherein in the second deriving, the slower-pace estimated goal time is derived based on the changed pace when the input operation to change the pace is accepted in the second accepting, and
   wherein in the display controlling, the changed slower-pace estimated goal time derived in the second deriving is displayed.

4. The estimated goal time display system according to claim 1, wherein the at least one processor is configured to perform:
   determining whether the user has run the predetermined distance based on the exercise data; and
   each time it is determined that the user has run the predetermined distance, deriving the pace at a point that it is determined that the user ran the predetermined distance.

5. The estimated goal time display system according to claim 1, further comprising:
   an exercise data obtaining apparatus; and
   an estimated goal time display apparatus,
   wherein the exercise data obtaining apparatus includes:
      an obtainer that sequentially obtains the exercise data while the user is running, and
      a transmitter that transmits, to the estimated goal time display apparatus, the exercise data sequentially obtained by the obtainer, and
   wherein the estimated goal time display apparatus includes:
      a receiver that sequentially receives the exercise data from the exercise data obtaining apparatus, and
      a processor that performs the first deriving based on the exercise data sequentially received by the receiver, performs the second deriving, and performs the display controlling.

6. The estimated goal time display system according to claim 1, further comprising:
   an exercise data obtaining apparatus; and
   an estimated goal time display apparatus,
   wherein the exercise data obtaining apparatus includes:
      an obtainer that sequentially obtains the exercise data while the user is running,
      a processor that performs the first deriving based on the exercise data sequentially received by the receiver, and performs the second deriving, and
      a transmitter that transmits, to the estimated goal time display apparatus, the estimated goal time, the faster-pace estimated goal time, and the slower-pace estimated goal time derived in the second deriving, and
   wherein the estimated goal time display apparatus includes:
      a receiver that receives the estimated goal time, the faster-pace estimated goal time, and the slower-pace estimated goal time from the exercise data obtaining apparatus, and
      a processor that performs the display controlling to display, on the display, the estimated goal time, the faster-pace estimated goal time, and the slower-pace estimated goal time received by the receiver.

7. The estimated goal time display system according to claim 1, further comprising an obtainer that sequentially obtains the exercise data while the user is running.

8. An estimated goal time display control method comprising:
   first deriving that derives a pace that a user runs a predetermined distance between a start point and a predetermined goal point, based on exercise data obtained while the user is running between the start point and the goal point, the predetermined distance being smaller than a total distance between the start point and the goal point;

second deriving that derives, based on the pace derived in the first deriving, (i) an estimated goal time at which the user will reach the goal point, (ii) a faster-pace estimated goal time at which the user will reach the goal point if the user increases the pace by a predetermined amount, and (iii) a slower-pace estimated goal time at which the user will reach the goal point if the user reduces the pace by a predetermined amount; and display controlling that displays, on a display, all of the estimated goal time, the faster-pace estimated goal time, and the slower-pace estimated goal time derived in the second deriving.

9. The estimated goal time display control method according to claim 8, further comprising:

first accepting that accepts an input operation to change the pace when the faster-pace estimated goal time is derived when the faster-pace estimated goal time is displayed on the display, wherein in the second deriving, the faster-pace estimated goal time is derived based on the changed pace when the input operation to change the pace is accepted, and wherein in the display controlling, the changed faster-pace estimated goal time derived in the second deriving is displayed on the display.

10. The estimated goal time display control method according to claim 9, further comprising:

second accepting that accepts an input operation to change the pace when the slower-pace estimated goal time is derived when the slower-pace estimated goal time is displayed on the display, wherein in the second deriving, the slower-pace estimated goal time is derived based on the changed pace when the input operation to change the pace is accepted, and wherein in the display controlling, the changed slower-pace estimated goal time derived by the second deriver is displayed on the display.

11. The estimated goal time display control method according to claim 8, further comprising:

determining whether the user has run the predetermined distance based on the exercise data, wherein each time it is determined that the user has run the predetermined distance, the pace is derived at a point that it is determined that the user has run the predetermined distance.

12. The estimated goal time display control method according to claim 8, further comprising sequentially obtaining the exercise data while the user is running.

13. The estimated goal time display control method according to claim 8, further comprising:

sequentially obtaining the exercise data while the user is running, transmitting the sequentially obtained exercise data, and sequentially receiving the exercise data, wherein the first deriving is performed based on the sequentially received exercise data.

14. The estimated goal time display control method according to claim 8, further comprising:

sequentially obtaining the exercise data while the user is running, wherein the first deriving is performed based on the sequentially received exercise data, transmitting the estimated goal time, the faster-pace estimated goal time, and the slower-pace estimated goal time derived in the second deriving, and receiving the estimated goal time, the faster-pace estimated goal time, and the slower-pace estimated goal time, wherein the display controlling is performed to display, on the display, the estimated goal time, the faster-pace estimated goal time, and the slower-pace estimated goal time received in the receiving.

15. A non-transitory computer readable storage medium having a program stored thereon that can be executed by a processor, wherein the program controls the processor to perform:

first deriving that derives a pace that a user runs a predetermined distance between a start point and a predetermined goal point, based on exercise data obtained while the user is running between the start point and the goal point, the predetermined distance being smaller than a total distance between the start point and the goal point;

second deriving that derives, based on the pace derived in the first deriving, (i) an estimated goal time at which the user will reach the goal point, (ii) a faster-pace estimated goal time at which the user will reach the goal point if the user increases the pace by a predetermined amount, and (iii) a slower-pace estimated goal time at which the user will reach the goal point if the user reduces the pace by a predetermined amount; and display controlling that displays, on a display, all of the estimated goal time, the faster-pace estimated goal time, and the slower-pace estimated goal time derived in the second deriving.

16. The storage medium according to claim 15, wherein the program further controls the processor to perform first accepting that accepts an input operation to change the pace when the faster-pace estimated goal time is derived when the faster-pace estimated goal time is displayed on the display, wherein in the second deriving, the faster-pace estimated goal time is derived based on the changed pace when the input operation to change the pace is accepted, and wherein in the display controlling, the changed faster-pace estimated goal time derived in the second deriving is displayed on the display.

17. The storage medium according to claim 16, wherein the program further controls the processor to perform second accepting that accepts an input operation to change the pace when the slower-pace estimated goal time is derived when the slower-pace estimated goal time is displayed on the display, wherein in the second deriving, the slower-pace estimated goal time is derived based on the changed pace when input operation to change the pace is accepted, and wherein in the display controlling, the changed slower-pace estimated goal time derived in the second deriving is displayed on the display.

18. The storage medium according to claim 15, wherein the program further controls the processor to perform determining that determines whether the user has run a predetermined distance based on the exercise data, and wherein each time the processor determines that the user has run the predetermined distance, the processor derives the pace at a point that it is determined that the user has run the predetermined distance.

19. The storage medium according to claim 15, wherein the program further controls the processor to control an obtainer that sequentially obtains the exercise data while the user is running.

20. An estimated goal time display system comprising:
an exercise data obtaining apparatus; and
an estimated goal time display apparatus,
wherein:
the exercise data obtaining apparatus includes:
an obtainer that sequentially obtains exercise data while a user is running; and
a transmitter that transmits, to the estimated goal time display apparatus, the exercise data sequentially obtained by the obtainer,
the estimated goal time display apparatus includes:
a receiver that sequentially receives the exercise data from the exercise data obtaining apparatus;
at least one processor; and
at least one memory, and
the at least one processor is configured to perform the following according to a program stored in the at least one memory:
first deriving that derives a pace that the user runs a distance set in advance between a start point and a goal point, based on the exercise data sequentially received by the receiver;
second deriving that derives an estimated goal time that the user will reach a preset goal point based on the pace derived in the first deriving, a faster-pace estimated goal time that the user will reach the goal point if the user makes the pace a predetermined amount of time faster, and a slower-pace estimated goal time that the user will reach the goal point if the user makes the pace a predetermined amount of time slower; and
display controlling that displays, on a display, the estimated goal time, the faster-pace estimated goal time and the slower-pace estimated goal time derived in the second deriving.

21. An estimated goal time display system comprising:
an exercise data obtaining apparatus; and
an estimated goal time display apparatus,
wherein the exercise data obtaining apparatus includes:
an obtainer that sequentially obtains exercise data when a user is running;
a processor that performs (i) first deriving that derives a pace that the user runs a distance set in advance between a start point and a goal point, based on the exercise data obtained when the user is running, and (ii) second deriving that derives an estimated goal time that the user will reach a preset goal point based on the pace derived in the first deriving, a faster-pace estimated goal time that the user will reach the goal point if the user makes the pace a predetermined amount of time faster, and a slower-pace estimated goal time that the user will reach the goal point if the user makes the pace a predetermined amount of time slower; and
a transmitter that transmits, to the estimated goal time display apparatus, the estimated goal time, the faster-pace estimated goal time, and the slower-pace estimated goal time derived in the second deriving, and
wherein the estimated goal time display apparatus includes:
a receiver that receives the estimated goal time, the faster-pace estimated goal time, and the slower-pace estimated goal time from the exercise data obtaining apparatus; and
a processor that performs display controlling that displays, on a display, the estimated goal time, the faster-pace estimated goal time, and the slower-pace estimated goal time received by the receiver.

22. An estimated goal time display control method in a system including an exercise data obtaining apparatus and an estimated goal time display apparatus, the method comprising:
by the exercise data obtaining apparatus:
sequentially obtaining exercise data while a user is running; and
transmitting, to the estimated goal time display apparatus, the sequentially obtained exercise data; and
by the estimated goal time display apparatus:
sequentially receiving the exercise data from the exercise data obtaining apparatus;
first deriving that derives a pace that the user runs a distance set in advance between a start point and a goal point, based on the sequentially received exercise data;
second deriving that derives an estimated goal time that the user will reach a preset goal point based on the pace derived in the first deriving, a faster-pace estimated goal time that the user will reach the goal point if the user makes the pace a predetermined amount of time faster, and a slower-pace estimated goal time that the user will reach the goal point if the user makes the pace a predetermined amount of time slower; and
display controlling that displays, on a display, the estimated goal time, the faster-pace estimated goal time and the slower-pace estimated goal time derived in the second deriving.

23. A non-transitory computer readable storage medium having a program stored thereon that can be executed in a system including an exercise data obtaining apparatus and an estimated goal time display apparatus, the program controlling a processor of the estimated goal time display apparatus to perform:
sequentially receiving, from the exercise data obtaining apparatus, exercise data which is sequentially obtained by the exercise data apparatus while a user is running and which is transmitted to the estimated goal time display apparatus;
first deriving that derives a pace that the user runs a distance set in advance between a start point and a goal point, based on the sequentially received exercise data;
second deriving that derives an estimated goal time that the user will reach a preset goal point based on the pace derived in the first deriving, a faster-pace estimated goal time that the user will reach the goal point if the user makes the pace a predetermined amount of time faster, and a slower-pace estimated goal time that the user will reach the goal point if the user makes the pace a predetermined amount of time slower; and
display controlling that displays, on a display, the estimated goal time, the faster-pace estimated goal time and the slower-pace estimated goal time derived in the second deriving.

24. An estimated goal time display control method in a system including an exercise data obtaining apparatus and an estimated goal time display apparatus, the method comprising:
by the exercise data obtaining apparatus:
sequentially obtaining exercise data when a user is running;

first deriving that derives a pace that the user runs a distance set in advance between a start point and a goal point, based on the exercise data obtained when the user is running;

second deriving that derives an estimated goal time that the user will reach a preset goal point based on the pace derived in the first deriving, a faster-pace estimated goal time that the user will reach the goal point if the user makes the pace a predetermined amount of time faster, and a slower-pace estimated goal time that the user will reach the goal point if the user makes the pace a predetermined amount of time slower; and transmitting, to the estimated goal time display apparatus, the estimated goal time, the faster-pace estimated goal time, and the slower-pace estimated goal time derived in the second deriving, and by the estimated goal time display apparatus:
receiving the estimated goal time, the faster-pace estimated goal time, and the slower-pace estimated goal time from the exercise data obtaining apparatus; and display controlling that displays, on a display, the estimated goal time, the faster-pace estimated goal time, and the slower-pace estimated goal time received from the exercise data obtaining apparatus.

25. A non-transitory computer readable storage medium having a program stored thereon that can be executed in a system including an exercise data obtaining apparatus and an estimated goal time display apparatus, the program controlling a processor of the exercise data obtaining apparatus to perform:

sequentially obtaining exercise data when a user is running;

first deriving that derives a pace that the user runs a distance set in advance between a start point and a goal point, based on the exercise data obtained when the user is running;

second deriving that derives an estimated goal time that the user will reach a preset goal point based on the pace derived in the first deriving, a faster-pace estimated goal time that the user will reach the goal point if the user makes the pace a predetermined amount of time faster, and a slower-pace estimated goal time that the user will reach the goal point if the user makes the pace a predetermined amount of time slower; and transmitting, to the estimated goal time display apparatus, the estimated goal time, the faster-pace estimated goal time, and the slower-pace estimated goal time derived in the second deriving, whereby the estimated goal time display apparatus receives the estimated goal time, the faster-pace estimated goal time, and the slower-pace estimated goal time from the exercise data obtaining apparatus, and performs control to display, on a display, the estimated goal time, the faster-pace estimated goal time, and the slower-pace estimated goal time received from the exercise data obtaining apparatus.

* * * * *